United States Patent [19]

Auer, Jr. et al.

[11] 4,316,652
[45] Feb. 23, 1982

[54] PHANTOM ELIMINATOR FOR SIGNAL LIGHTS

[75] Inventors: John H. Auer, Jr., Fairport; David Birnbaum, Pittsford, both of N.Y.

[73] Assignee: General Signal Corporation, Stamford, Conn.

[21] Appl. No.: 91,314

[22] Filed: Nov. 5, 1979

[51] Int. Cl.³ .............................................. G02B 17/00
[52] U.S. Cl. .................................. 350/276 R; 340/382
[58] Field of Search ........................ 350/266, 276 R; 340/382

[56] References Cited

U.S. PATENT DOCUMENTS

| 597,134 | 1/1888 | Adams | 350/266 |
|---|---|---|---|
| 2,327,144 | 8/1943 | Stam | 340/382 X |
| 2,336,680 | 12/1943 | Gillespie | 350/142 X |

FOREIGN PATENT DOCUMENTS 424062  1/1926  Fed. Rep. of Germany ...... 340/382

Primary Examiner—John K. Corbin
Assistant Examiner—Matthew W. Koren
Attorney, Agent, or Firm—Milton E. Kleinman; George W. Killian

[57] ABSTRACT

An improved signal light employing a deep-dish reflector and critically positioned mask or masks for blocking at least some selected light rays having their origin in an external source to reduce, or eliminate, phantom signals. The mask is effective to block out at least a portion of the reflector which reflects light, from an external source, back out of the signal in a direction parallel to the reflector axis. The mask may take the form of a planar ring, a cylindrical surface, a cone or portions thereof. Other shapes may prove expedient or the reflector may be treated in selected and controlled locations to inhibit reflection. The mask may comprise any suitable material such as an opaque material or an electrically controlled optical shutter which is closed when it is desired to inhibit phantom signals and opened to accommodate normal signals.

6 Claims, 13 Drawing Figures

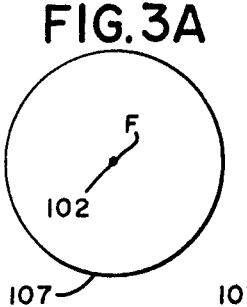 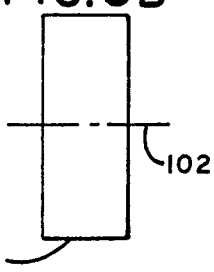 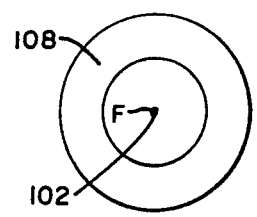 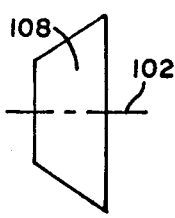
FIG. 3A  FIG. 3B  FIG. 4A  FIG. 4B
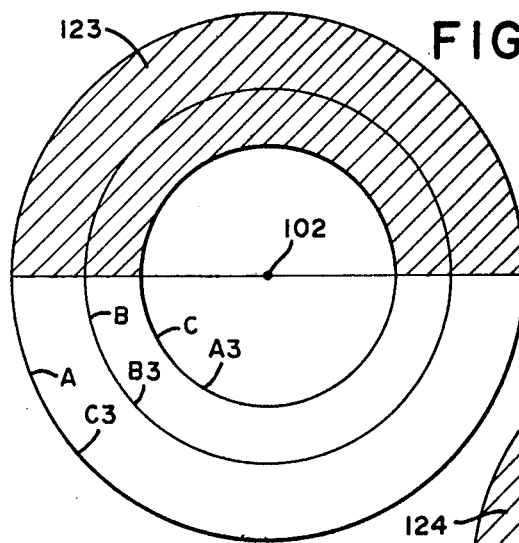
FIG. 6A
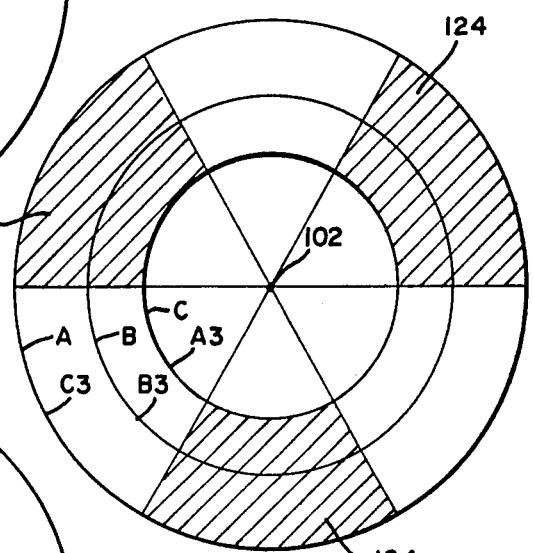
FIG. 6B
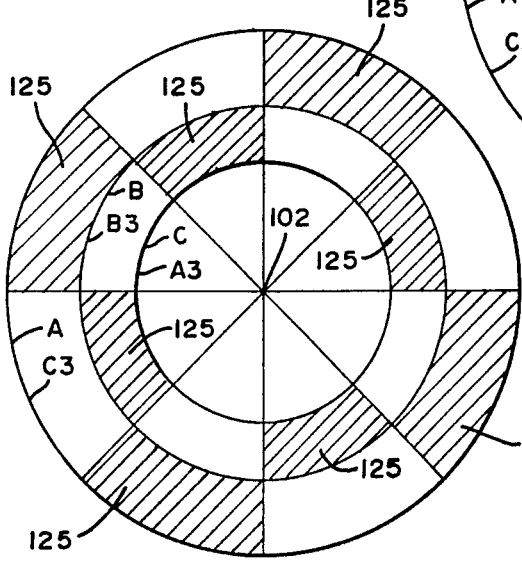
FIG. 6C

PHANTOM ELIMINATOR FOR SIGNAL LIGHTS

BACKGROUND OF THE INVENTION

Selectively illuminated traffic control signals and/or similar devices are so commonly used as to be familiar to anyone walking along public streets or riding in a vehicle along public highways. Among other things, traffic lights are used to regulate the flow of both automotive and railroad traffic or a combination thereof. For example, where a highway crosses a railroad track, it is common to see a traffic light visible to the highway traveler and which serves to warn that a train is approaching the intersection.

As is well known, traffic lights typically employ an incandescent lamp together with a reflector system which collects and focuses the light so that the emitted light rays are concentrated in a beam which may be most readily seen by the pedestrian and/or driver for whose benefit the signal light is placed. In order to be energy efficient, it is customary to use curved reflectors in association with the lamp to collect and focus the light rays so that they are emitted essentially parallel to the axis of the reflector, or at a small angle of dispersion with respect thereto. Occasionally, circumstances are such that at selected times of the day, or year, light from an external source, most commonly the sun, can enter the signal through the front, be reflected one or more times by the reflecting surface and re-emerge in such a way as to simulate a normal signal from the lamp. Such apparent signals resulting from light originating externally are customarily referred to as "phantom" signals and can give rise to unsafe, confusing and ambiguous conditions. For example, a typical traffic light which may have the three colors red, yellow and green, indicating stop, caution and go, respectively, may receive sunlight and creats a simultaneous phantom signal from each of the three reflectors thereby providing a confusing or ambiguous signal to the highway traveler. Because phantom signals can cause confusion and accident, considerable inventive ingenuity has been exercised in an attempt to eliminate or minimize phantom signals. For example, U.S. Pat. No. 2,097,785 issued Nov. 2, 1937 to O. S. Field and assigned to the same assignee as the present invention teaches the use of funnel-shaped members having longitudinal corrugations to reflect light to non-parallel paths to thereby minimize or eliminate phantom signals. U.S. Pat. No. 2,207,656 issued July 9, 1940 to C. H. Cartwright, et al, teaches the treatment of the surface on the front lens whereby to render the lens non-reflective. U.S. Pat. No. 2,243,448 issued May 27, 1941 to W. B. Wells, et al, teaches phantom elimination in a specialized light signal having at least two optical systems and provides means for preventing light rays entering a signal from a foreign external source through one optical system from causing the other optical system to display a phantom signal. U.S. Pat. No. 2,286,201 to C. L. Ferrin, et al, employs an internal apertured plate and a front element comprising a plurality of lenses. U.S. Pat. No. 2,336,680 issued Dec. 14, 1943 to S. E. Gillespie provides phantom elimination by light-polarizing means. U.S. Pat. No. 2,413,127 issued Dec. 24, 1946 to W. B. Wells uses a conical roundel to prevent reflection of light from an external source. Other patents disclosing structures relating to phantom signals include U.S. Pat. Nos. 2,419,444; 2,576,849; 2,750,577; 3,235,863; and 3,377,479.

SUMMARY OF THE INVENTION

This invention relates to phantom elimination from traffic control signals which employ deep-dish reflectors for more energy efficient light transmission. When the signal light is required to be oriented so as to be subject to phantoms resulting from light from an external source, the structure includes one or more critically positioned masks for blocking at least some of the light rays which enter the system parallel to the optical axis of the reflector. More specifically, the mask is positioned to intercept at least some of the light rays, at some point in their path, which might otherwise enter the signal and be reflected out of the signal lamp as a phantom signal.

The mask may take a wide variety of shapes and may comprise at least part of a planar disk or ring; or it may comprise at least part of a cylindrical surface having an axis coincident with the optical axis of the reflector or the mask may comprise at least part of a conical surface having an axis coincident with the optical axis of the reflector. Other shapes and/or combinations may be used, or the reflector may be selectively modified, or treated, to inhibit reflections from selected areas. In an alternate structure an electrically controlled shutter could be used.

It is an object of this invention to provide a new and improved signal light.

It is a more specific object of the invention to provide a signal light such as a traffic control signal which produces a minimal phantom signal in response to light from an external source.

It is another object of the invention to provide an energy efficient traffic signal which may be readily and economically adapted to phantom elimination when required by the exigencies of orientation.

It is an even more specific object of the invention to intercept at least some of the light rays entering the signal light from an external source and which are parallel to the optical axis of the reflector such that they would be reflected by the reflector through the focal point to another point on the reflector.

It is another object of the invention to minimize phantom signals by use of an optical mask which is opaque only when the traffic signal light is off.

BRIEF DESCRIPTION OF THE DRAWING

The drawing comprises FIGS. 1 to 8 wherein:

FIGS. 3A and 3B comprise a front and side view of another mask of FIG. 1;

FIGS. 4A and 4B comprise front and side views of another mask illustrated in FIG. 1;

FIGS. 6 to 6C illustrate a variety of alternate masks which may be used to provide equivalent results;

While parabolic reflectors have been illustrated, it should be understood that other classical forms of reflectors may be employed.

DESCRIPTION OF THE PREFERRED EMBODIMENTS

Figure 1:
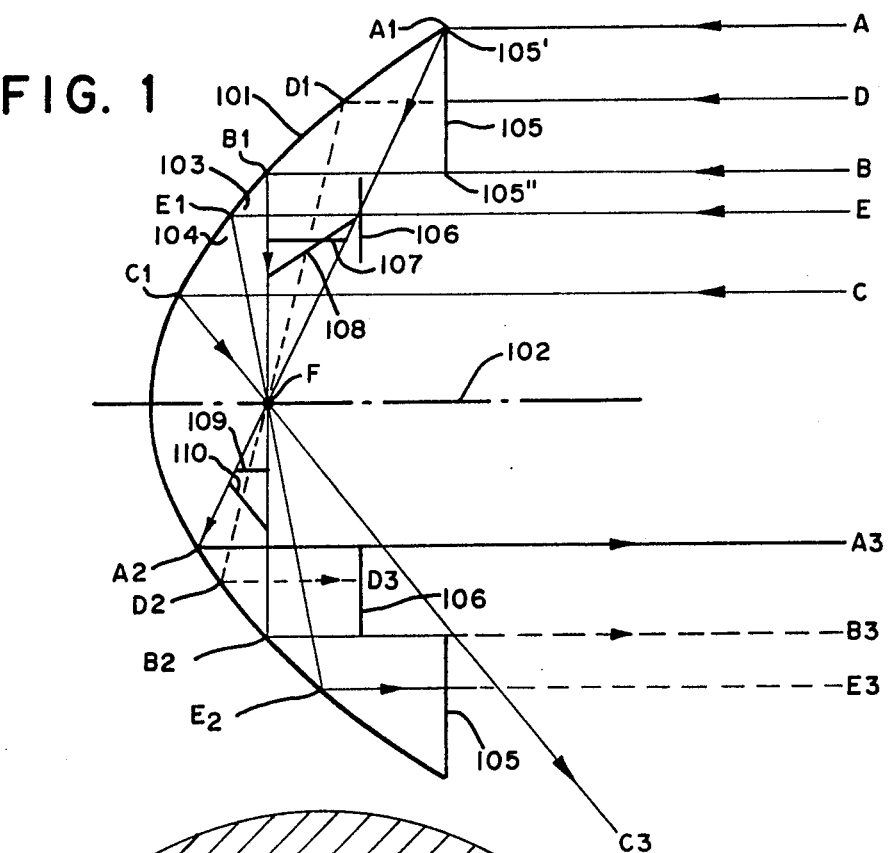
FIG. 1 comprises a cross section of a parabolic reflector illustrating light ray paths and the effect of masks placed in a variety of positions.

The concepts incorporated in this invention, together with the details of operation may be more fully understood by considering together the following description taken in cooperation with the drawing. In FIG. 1, element 101 constitutes a cross section of a reflector surface taken on a plane including the axis of the reflector. More specifically, the reflector 101, as drawn in FIG. 1, comprises a cross section view of a deep-dish parabolic reflector having a surface generated by revolving the line 101 about the axis 102. In addition, it should be understood that other classical reflector shapes, such as spherical, may be used in association with the invention described herein. A reflector 101 of the type which is typically used with signal lights has a focal point which is designated "F". For the purposes of this description, the focal point may be defined as a point on the optical axis 102 of the reflector 101 through which any rays of light parallel to the optical axis converge after being reflected on the reflector surface 101. For example, light ray A impinges on the reflector surface at point A1 and through the focal point F to impinge of the reflective surface 101 at point A2 from which it is reflected out on line A3 which is parallel to the optical axis 102. In a similar manner, light ray B reflects at point B1, passes through focal point F and reflects at point B2 for reflection out along line B3. However, it will be seen that light ray C which is parallel to the optical axis 102 impinges on the reflector at point C1 and is reflected through the focal point F and out along ray C3. That is, the light reflected from point C1 does not impinge on the reflector 101 a second time and is reflected out of the system at an angle other than parallel to the optical axis 102. Accordingly, light ray C3 is not visible within the normal viewing angle of the signal light and thus does not contribute to an objectionable phantom signal.

It should be observed that in accordance with laws of optics, the angle of incidence is always equal to the angle of reflection. By way of explanation, this means, for example, that light ray E. which reflects at point E1 is reflected therefrom such that the angle 103 which is formed between the line E-E1 and a tangent to the arc A1-C1 at the point of E1 is exactly equal to the angle 104 formed between the line E1-E2 and the same tangent line. In like manner, the angled formed between the ray of incidence, and the ray of reflection and the plant tangent to the reflector 101 at the point of reflection are equal.

From the above it will be evident that all light rays between rays A and B and which are parallel to the optical axis 102 are reflected out of the reflector 101 essentially parallel to their original direction.

It is the reflected rays such as A3, B3 and E3 which cause phantom signals. More specifically, traffic signals are usually oriented so that the viewer, who is supposed to see the signal, is approximately on the optical axis or a relatively few degrees therefrom. Accordingly, a traffic light which is situated such that light rays may enter parallel to the optical axis will have light reflected out and parallel to the optical axis thereby creating a phantom signal. It should be understood, of course, that normal signals are created by means of an incandescent bulb which is located at approximately the focal point F and light rays emitted therefrom reflect on the surface 101 and out parallel to the optical axis 102.

It will be apparent that phantom signals could be avoided by employing a reflector 101 which extends only from point B1 to point B2. With such a reflector, any light ray such as E. would reflect on the reflector at point E1, pass through the focal point F and, since there is no reflector portion past point B2, the light ray will not be reflected and will not extend along the line E3 to create a phantom signal. However, light signals of this type are not energy efficient and give a weak signal or require a higher input signal to provide the desired light level. Accordingly, since phantom signals are created only when the light signal has a predetermined orientation and only at selected times and/or dates, it is common practice to provide energy efficient deep-dish reflectors and to modigy the system at least those situations wherein phantom signals may be produced.

It will be evident that if a mask 105, which serves to absorb or intercept light rays, is placed as illustrated in FIG. 1 that all light rays parallel to the optical axis 102 and between light rays A and B will be intercepted and will not be able to be reflected out and parallel to the optical axis 102. For example, light ray D will strike the mask 105 and be intercepted or stopped there instead of extending through the point D1 where it would otherwise be reflected through the focal point F and reflected again at point D2 to emerge from the system parallel to the optical axis. It will also be apparent that instead of employing the mask 105, a mask 106 could be used with similar results. In this case, the light ray D reflects at points D1 and D2 but is stopped by the mask 106 as point D3. As may be seen from FIG. 1, the mask 106 extends between light rays A3 and B3. It will be evident that a wide variety of other masks could be employed in other locations to achieve identical results. For example, mask 107 could be placed parallel to the optical axis 102, or mask 108 could be used at an angle relative to the optical axis 102. 109 and 110 indicate 2 additional mask locations which would provide the same general effect as mask 105.

Figure 2:
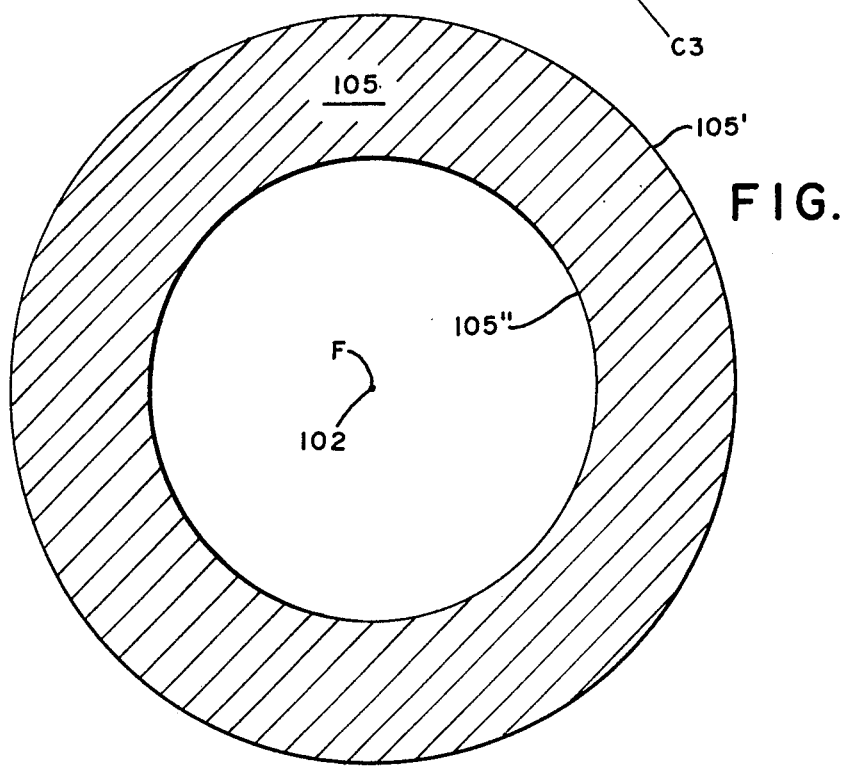
FIG. 2 comprises a front view of one of the masks of FIG. 1.

FIG. 2 comprises a front view of the mask 105. From this view, it may more readily be seen that the mask 105 comprises a planar disk similar to a washer having an axis which is concentric with the optical axis 102 which passes through the focal point F. 105' and 105'' comprise the outer and inner limits, respectively, of the mask 105.

FIG. 3A shows, on a reduced scale with respect to FIG. 1, a view of the mask 107 as seen when looking along the axis 102. FIG. 3B comprises a side view of the same mask 107. Accordingly, as may be seen, the mask 107 comprises a portion of a right circular cylinder having an axis coincident with the optical axis 102.

In a similar manner, FIGS. 4A and 4B comprise front and side views, respectively, of the mask 108 illustrated in FIG. 1.

Figure 5:
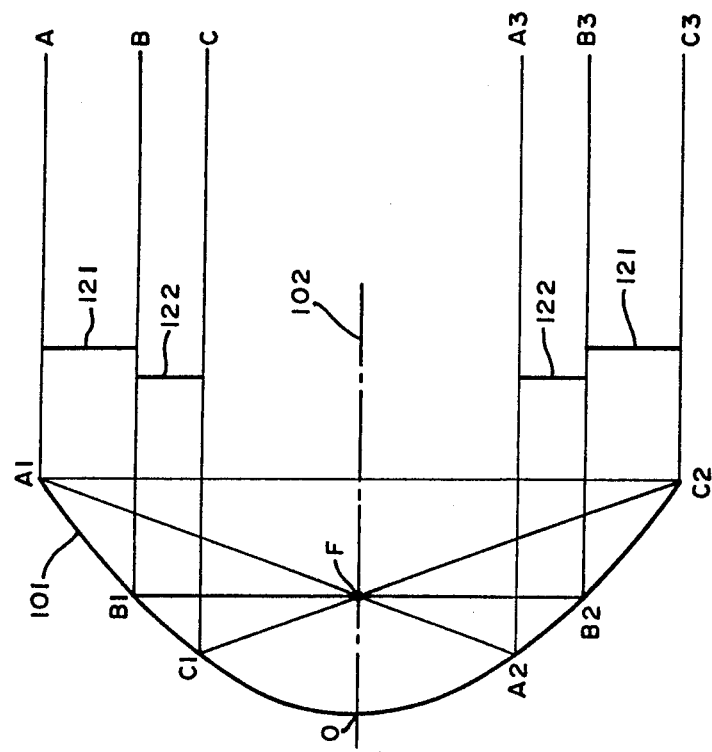
FIG. 5 illustrate a parabolic reflector and another form of mask together with selected light rays.

Consideration should now be given to FIG. 5 wherein certain symmetrical and non-symmetrical relationships will be observed. The reflector 101, shown in cross section, is illustrated as a parabolic reflector comprising the surface generated by revolving the line 101 about its axis 102. As with FIG. 1, light rays A, B and C, together with their points of incidence and reflection, are illustrated. It should be observed that light ray A, which enters the reflector 101 at a maximum distance from the axis 102, leaves the reflector 101 parallel to the axis 102 but much closer thereto. Conversely, light ray C, which enters the system relatively close to the axis 102, as compared with light ray A, leaves the system after being reflected at points C1 and C2 parallel to the axis 102 but at a greater distance therefrom. Examination will show that the minimum distances between the axis 102 and light rays A and C3 are identical and that the distance between the axis 102 and the light rays A and C3 are identical and that the distance between the axis 102 and the light rays C and A3 are identical. If light ray B is chosen as that ray which has its reflection points B1 and B2 on the same line with the focal point F, it will be seen that light rays B and B3 are equidistant from the axis 102. If a mask of the type illustrated as 105 in FIGS. 1 and 2 is used in conjunction with the system of FIG. 5, it will be evident that the net result is that the system of FIG. 5 will, in effect, be converted from a deep-dish reflector to a shallow-dish reflector. For the purposes of this discussion, a deep-dish reflector may be defined as one wherein the limits of the reflector 101 extend beyond a plane which is at right angles to the axis 102 and includes the point F. A shallow-dish reflector may be defined as a reflector which has no portion extending beyond a plane at right angles to the axis 102 and including the point F. As may be seen, if a shallow-dish reflector is used, there will be no phantom signal, as any light ray entering the system between rays B and B3 will be reflected from the surface 101 through the focal point F and will not again encounter the reflector 101 for reflection out parallel to the axis 102. However, as already mentioned, shallow-dish reflectors do not provide an energy efficient system and therefore it is expedient to provide deep-dish reflectors in at least those situations wherein the occurrence of phantom signals is not expected to occur.

For those few situations wherein phantom signals may be expected to occur, a standard deep-dish reflector may be employed and converted to a shallow-dish reflector by means of a mask such as that described in connection with FIG. 2. However, as stated, the conversion of the reflector from a deep-dish reflector to a shallow-dish reflector results in certain energy inefficiency, and the brilliance of the beam emerging from the signal in response to the illumination of an interior incandescent light bulb (not shown) will result in a weaker signal.

Figure 6:
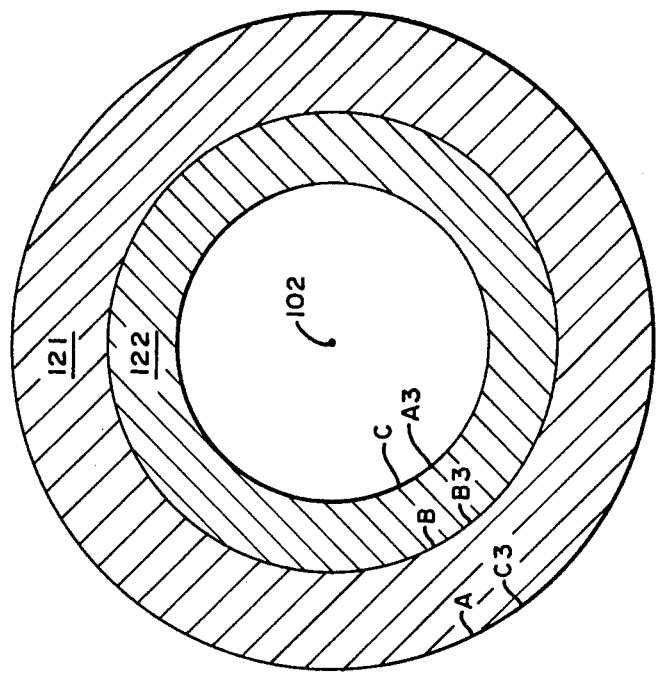

Considering now more specifically FIG. 6, there will be seen a view looking toward the reflector 101 of FIG. 5 and along the axis 102. The outer circle designated A and C3 comprises the outer limits of the reflector 101 and the many different points at which a light ray A may be received or a light ray C3 reflected therefrom. In a similar manner, the inner circle designated C and A3 represents the many points at which a light ray C may enter the system or a light ray A3 be reflected therefrom; and the center circle designated B and B3 constitutes the many points at which a light ray B may enter the system or a light ray B3 may be reflected therefrom. It should be evident that a mask which will convert the reflector 101 to a shallow-dish reflector may comprise a ring or washer which will intercept all the incoming light rays between the outermost and center circles. Such a mask is shown in FIG. 5 and, for convenience of illustration, displaced outward from the reflector 101 and designated 121 in FIGS. 5 and 6. There is also shown an alternate mask 122 in FIGS. 5 and 6 which, while different in size and placement, may be seen to have the same results as the mask 121. More specifically, if mask 122 is considered to be in place and mask 121 removed, it will be seen that any ray of light entering the system between rays and and B will be reflected on the surface 101 and through the focal point F to again be reflected from the reflecting surface 101 and be intercepted by the mask 122. In a similar manner, any light rays entering the system between rays B3 and C3 will reflect from the surface 101 through the focal point F and again be reflected from the reflecting surface 101 to be intercepted by the upper portion of the mask 122.

In summary, either of the masks 121 or 122 will intercept the same light rays and therefore should be equally effective in preventing phantom signals. However, since mask 122 intercepts an intermediate ring of rays, it will be evident that the signal from internally-generated light rays (from a light bulb not shown) may be perceived as different by a viewer. This mask 122 permits signal dispersion over a larger field, albeit with a weak ring portion.

It will also be apparent that if a sun shade is used and external light can never enter selected portions of the signal, corresponding portions of the mask 121 or 122 could be eliminated, thereby again increasing the energy efficiency.

Furthermore, if a weak phantom is not objectionable, the mask area may be selectively reduced to enhance the normal signal. Empirical tests will help to determine optimum mask size and orientation.

Once it is recognized that the masks 121 and 122 can provide similar intercept service, it may be seen that a wide variety of masks may be designed which will be equally serviceable for intercepting the light rays which are effective to produce the undesired phantom signal. For example, one such alternate mask 123 is shown in the shaded section of FIG. 6A. Considering FIG. 6A, which is drawn to a reduced scale, with respect to FIG. 5, it will be seen that any light rays entering the upper half of the system between the boundaries of the locus of light rays A and B will be intercepted by the portion of the mask 123 between the outer two circles. Similarly, any light rays entering the lower half of the system between the locus of point B3 and C3 will be intercepted by that portion of the mask 123 residing between the inner and central circles of FIG. 6A.

Another suitable form of mask 124 is illustrated in FIG. 6B. Another mask 125 is shown in FIG. 6C. An analysis will show that it offers the same theoretical results. Quite obviously, a wide variety of mask designs could be employed.

While each of these designs may have the same theoretical results with respect to prevention of phantom signals, it will be appreciated that they are not identical with respect to the signals produced in response to the illumination of the internal incandescent lamp.

Experimentation with different forms of masks and different conditions has revealed that they have somewhat different effectiveness in eliminating phantoms, and/or that they have different effects on the light beam as projected from the system in response to illumination of the internal lamp and as perceived by the viewer. The reasons for the difference may be a variety of factors including, but not limited to, accuracy of mask design and placement, the efficiency of the mask in absorbing light rays, the area of the mask, imperfections in the reflecting surface 101, lack of accurate alignment of the incandescent lamp source, the idiosyncracies of the human eye in responding to signals of varying brilliance and area, and/or a variety of other factors.

All of the masks illustrated in FIGS. 6 through 6C comprised masks lying in a single plane. However, as mentioned in connection with FIGS. 1, 3A, 3B, 4A and 4b, the mask may take cylindrical or conical shapes.

Figure 7:
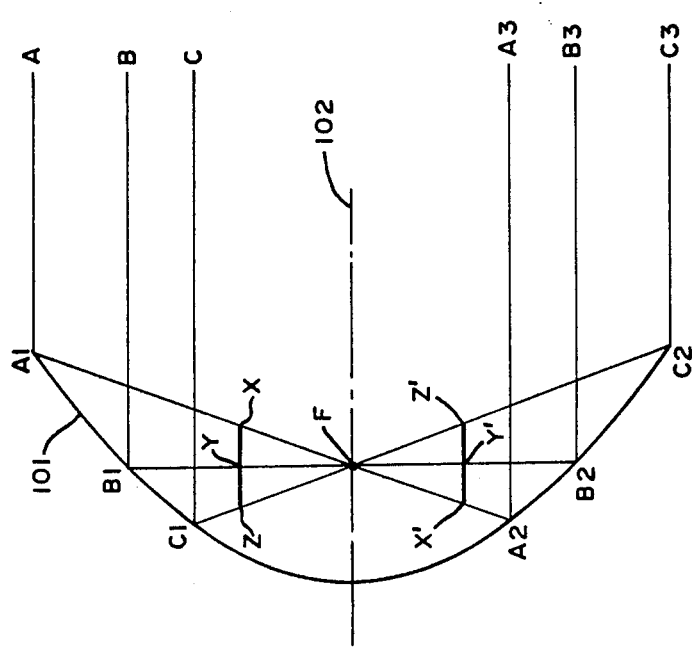
FIG. 7 illustrates another reflector and a cylindrical mask.

Considering now FIG. 7, it will be seen that it is similar to FIG. 5. As suggested with respect to FIGS. 1, 3A and 3B, a cylindrical mask might be employed. For example, all of the rays entering the system between rays A and B or between rays B3 and C3 can be prevented from introducing a phantom signal by including a cylindrical mask having an axis 102 coincident with the axis 102 of the reflecting surface 101 and having the left-most boundary determined by a plane at right angles to the axis 102 and pasing through the focal point F and having a right-hand boundary lying in a plane normal to the axis 102 and including the points X and Z' wherein X is the locus of all possible light rays A intersecting with the last-named plane and which is also coincident with the intersection of the locus of all points of light ray C after reflection at point C1 with the last-named plane. It may also be seen that similar results may be obtained by a cylindrical mask generated by revolving the rectangle Y, Z, X', Y' about the axis 102. Furthermore, the described cylindrical masks may have different radii of curvatures and different lengths with the length increasing as the radius of curvature increases.

Figure 8:
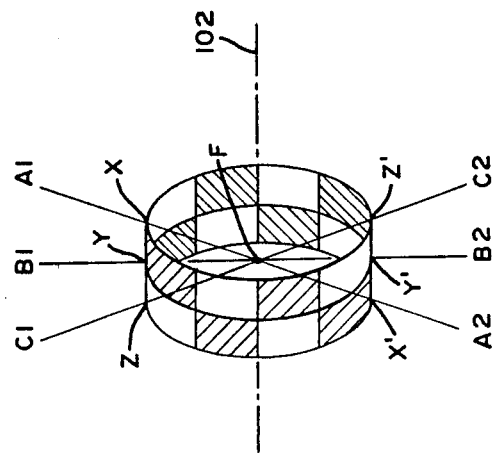
FIG. 8 provides an isometric view of the mask of FIG. 7.

In connection with FIGS. 5 through 6C, it was shown that various combinations of the two disk masks 121 and 122 could be used to make a mask. In a similar fashion, different portions of the cylinders to the left of the line B1-B2 and to the right of the same line of FIG. 7 may be used to make a mask. For example, FIG. 8 illustrates one form of mask which might be used. By analogy with FIGS. 6 through 6C, other cylindrical masks may be readily envisioned.

A choice of which style of mask is used in any particular application may depend upon the variety of factors already listed as well as personal preference and/or mounting or supporting techniques.

In addition to providing masks as illustrated, it will be evident that segmented conical masks could be provided. Furthermore, the reflector surface 101 could be treated to prevent reflections therefrom. For example, and referring now to FIG. 5, it would be apparent that by treating the reflecting surface 101 between points A1 and B1 a mask corresponding to mask 121 could be produced; and by selectively treating various portions of the reflecting surface 101, a mask corresponding to any of those illustrated in FIGS. 6A to 6C and/or many others could be created. Since the cylindrical masks are the full equivalent of selected planar disk masks, it is also evident that treating the reflecting surface 101 could provide results similar to any of the cylindrical or conical masks.

As thus far described, all masks have been considered opaque for preventing the transmission of light rays. However, it will be apparent that if circumstances permit, a mask may be made which is not entirely opaque. Furthermore, masks could be made of light polarizing material with appropriate orientation such that light rays which produce phantom signals pass through first and second mask portions before and after first and second reflections, respectively, and which are oriented at 90° with respect to each other whereby such light rays entering the system are prevented from leaving and thereby preventing phantom signals. Such a mask could comprise, for example, a mask of the type illustrated in FIG. 6 wherein the first light polarizing element comprises element 121 and the second light polarizing element comprises element 122. Such a mask would have relatively little effect on light rays emitted from the internal source.

Another type of mask for eliminating phantom signals without significantly reducing the signal level would comprise an electrically controlled optical shutter instead of an opaque mask. Such a shutter could take any of the aforedescribed configurations or could comprise a planar or curved surface covering the entire reflector. An electrical shutter might be fabricated of a liquid crystal electrically controlled by the same energy which lights an internal incandescent bulb. When the bulb is lit, the mask will become transparent, and when the bulb is off the mask becomes opaque, thereby preventing the entry of light rays which might generate phantom signals. The shutter may be opened when the internal bulb is lit as, at such time, the production of a phantom signal merely reinforces the desired signal.

While there has been shown and described what is considered at present to be a preferred embodiment of the invention, modification thereto will readily occur to those skilled in the related arts. For example, in another structure the same principles of mask design and placement could be applied for use in systems having reflectors which are not entirely symmetrical about an optical axis. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A signal light for reducing phantom signals and comprising in combination;
   a. a deep-dish reflector for collecting and focusing light and having an optical axis and a focal point;
   b. said reflector configured to cause light rays entering and signal light from an external source and in a direction parallel to said optical axis to impinge on said reflector and be reflected through said focal point;
   c. said reflector further configured to cause light rays which are reflected through said focal point, and which thereafter impinge on said reflector, to be reflected so as to emerge from said signal light in a direction substantially parallel to said optical axis; and
   d. means comprising at least part of a planar surface whose plane is normal so that of said optical axis and which is positioned within said signal for intercepting at least some of the light rays from said external source which would otherwise impinge on said reflector before and after passing through said focal point and emerge from said signal light in a direction substantially parallel to said optical axis.

2. The combination as set forth in claim 1 wherein at least part of said means constitutes an opaque mask.

3. The combination as set forth in claim 2 wherein at least some pairs of points on a line, normal to and intersecting said axis and equidistant therefrom, will not both coincide with an opaque portion of said mask.

4. The combination as set forth in claim 1 wherein said means includes light polarizing means.

5. The combination as set forth in claim 4 wherein said means may comprise a mask for polarizing light in a first direction in one portion of said mask and means for polarizing light in a second direction in a portion of said mask situated 90° from said one portion.

6. A signal light for reducing phantom signals and comprising in combination:
   a. a deep-dish reflector for collecting and focusing light and having an optical axis and a focal point;
   b. said reflector configured to cause light rays entering the signal light from an external source and in a direction parallel to said optical axis to impinge on said reflector and be reflected through said focal point;
   c. said reflector further configured to cause light rays which are reflected through said focal point, and which thereafter impinge on said reflector, to be reflected so as to emerge from said signal light in a direction substantially parallel to said optical axis; and
   d. means comprising at least part of a right circular cylinder whose axis is coincident with said optical axis and at least parts of which are opaque, positioned within said signal for intercepting at least some of the light rays from said external source which would otherwise impinge on said reflector before and after passing through said focal point and emerge from said signal light in a direction substantially parallel to said optical axis; and wherein
   e. at least some pairs of points on a line, normal to and intersecting said axis and equidistant therefrom, will not both coincide with an opaque portion of said means.

* * * * *